(12) United States Patent
Hale et al.

(10) Patent No.: US 10,666,631 B2
(45) Date of Patent: May 26, 2020

(54) DISTRIBUTED VALIDATION OF CREDENTIALS

(71) Applicant: Pivotal Software, Inc., San Francisco, CA (US)

(72) Inventors: Joseph Benjamin Hale, Corte Madera, CA (US); Sree Lekha Tummidi, Fremont, CA (US)

(73) Assignee: Pivotal Software, Inc., San Francisco, AZ (US)

( * ) Notice: Subject to any disclaimer, the term of this patent is extended or adjusted under 35 U.S.C. 154(b) by 321 days.

(21) Appl. No.: 15/839,687

(22) Filed: Dec. 12, 2017

(65) Prior Publication Data

US 2018/0167374 A1 Jun. 14, 2018

Related U.S. Application Data

(60) Provisional application No. 62/434,325, filed on Dec. 14, 2016.

(51) Int. Cl.
*H04L 29/06* (2006.01)
*H04L 29/08* (2006.01)
(Continued)

(52) U.S. Cl.
CPC ............ *H04L 63/08* (2013.01); *G06F 21/335* (2013.01); *G06F 21/41* (2013.01); *G06F 21/604* (2013.01); *H04L 9/3213* (2013.01); *H04L 41/28* (2013.01); *H04L 63/0807* (2013.01); *H04L 63/0815* (2013.01); *H04L 63/0892* (2013.01); *H04L 67/306* (2013.01)

(58) Field of Classification Search
CPC ...... G06F 21/604; G06F 21/335; G06F 21/41; H04L 63/08; H04L 63/0807; H04L 63/0815; H04L 9/3213; H04L 63/0892; H04L 67/306; H04L 41/28
USPC .............................................. 726/5
See application file for complete search history.

(56) References Cited

U.S. PATENT DOCUMENTS 7,076,637 B2 * 7/2006 Kelley ................. G06F 9/4812
712/43
2009/0249435 A1 * 10/2009 Madathilparambil George ..........
G06F 21/57
726/1

(Continued)

OTHER PUBLICATIONS

International Search Report and Written Opinion in International Application No. PCT/US2017/065893, dated May 16, 2018, 15 pages.

(Continued)

*Primary Examiner* — Kambiz Zand
*Assistant Examiner* — Benjamin A Kaplan
(74) *Attorney, Agent, or Firm* — Fish & Richardson P.C.

(57) ABSTRACT

Systems, methods, and computer program products for distributed validation of credentials are described. Upon receiving a request to perform an action by a user, a system performs a multi-part authentication where in each part, only a portion of authentication information is passed. In a first stage, an application manager of the system receives a first token than specifies partial access rights. In a second stage, a cloud controller of the system requests and receives privileges of the user separately from the first token. An API is presented with a token that only contains the authorities that the API needs, while still allowing validation of cloud controller permissions without having to escalate the user's privileges.

20 Claims, 2 Drawing Sheets

(51) Int. Cl.
   *H04L 12/24*   (2006.01)
   *H04L 9/32*   (2006.01)
   *G06F 21/60*   (2013.01)
   *G06F 21/33*   (2013.01)
   *G06F 21/41*   (2013.01)

(56) References Cited

U.S. PATENT DOCUMENTS

| | | | |
|---|---|---|---|
| 2009/0260050 A1* | 10/2009 | George | G06F 21/53 726/1 |
| 2012/0144501 A1 | 6/2012 | Vangpat et al. | |
| 2013/0160108 A1 | 6/2013 | Stachel | |

OTHER PUBLICATIONS

'Pivotal' [online]. "Introducing the UAA and Security for Cloud Foundry," Jul. 23, 2012, [retrieved on May 5, 2018]. Retrieved from the Internet: URL: <https://content.pivotal.io/blog/introducing-the-uaa-and-security-for-cloud-foundry>. 7 pages.

* cited by examiner

DISTRIBUTED VALIDATION OF CREDENTIALS

CROSS-REFERENCE TO RELATED APPLICATION

This application claims priority to U.S. Provisional Application No. 62/434,325, filed on Dec. 14, 2016. The disclosure of the prior application is considered part of and is incorporated by reference in the disclosure of this application.

BACKGROUND

This disclosure relates to authenticating techniques in a cloud computing environment.

In a conventional cloud computing environment, permissions model is sometimes split between multiple parties. For example, a part of the permissions model can be implemented by a system that manages user accounts, e.g., a user account authentication (UAA) server, whereas another part of the permissions model can be implemented in a system that manages spaces and user roles, e.g., a cloud controller. In such implementations, an adjacent API of an application, e.g., an application running in the cloud computing environment and secured with OAuth, may need the UAA to issue tokens with OAuth authorities for the application's own behavior as well as authorities that would enable the application to reconcile the cloud controller permissions. The commingling of the authorities for the application's own behavior and the authorities for reconciling with cloud controller permissions may be undesirable.

SUMMARY

This specification describes techniques for distributed validation of credentials. Upon receiving a request to perform an action by a user, a system performs a multi-part authentication where in each part, only a portion of authentication information is passed. In a first stage, an application manager of the system receives a de-privileged token than specifies partial access rights. In a second stage, a cloud controller of the system requests and receives privileges of the user separately from the de-privileged token and through a securely encrypted channel. Thus, the techniques ensure that an application programming interface (API) of an application program is presented with a token that only contains the authorities that the application program needs, while still allowing validation of cloud controller permissions without having to escalate the user's privileges.

In conventional techniques, when authentication is needed by more than one components, a split permissions model requires a union of the permissions required for multiple parts, one for each component. This specification discloses how to distribute the validation of the permissions without escalating privileges for either validating party.

The subject matter described in this specification can be implemented in various embodiments so as to realize one or more of the following advantages. The disclosed techniques improve upon conventional authentication systems by providing a more secure authentication system, where system privileges do not need to accompany an authentication token. Sensitive components of a system, e.g., a cloud controller, may authenticate a user action separately, preventing the privileges to access the sensitive components from being mingled with application-level authentication. The commingling of the authorities for the application's own behavior and the authorities for reconciling with cloud controller permissions in a conventional system is avoided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
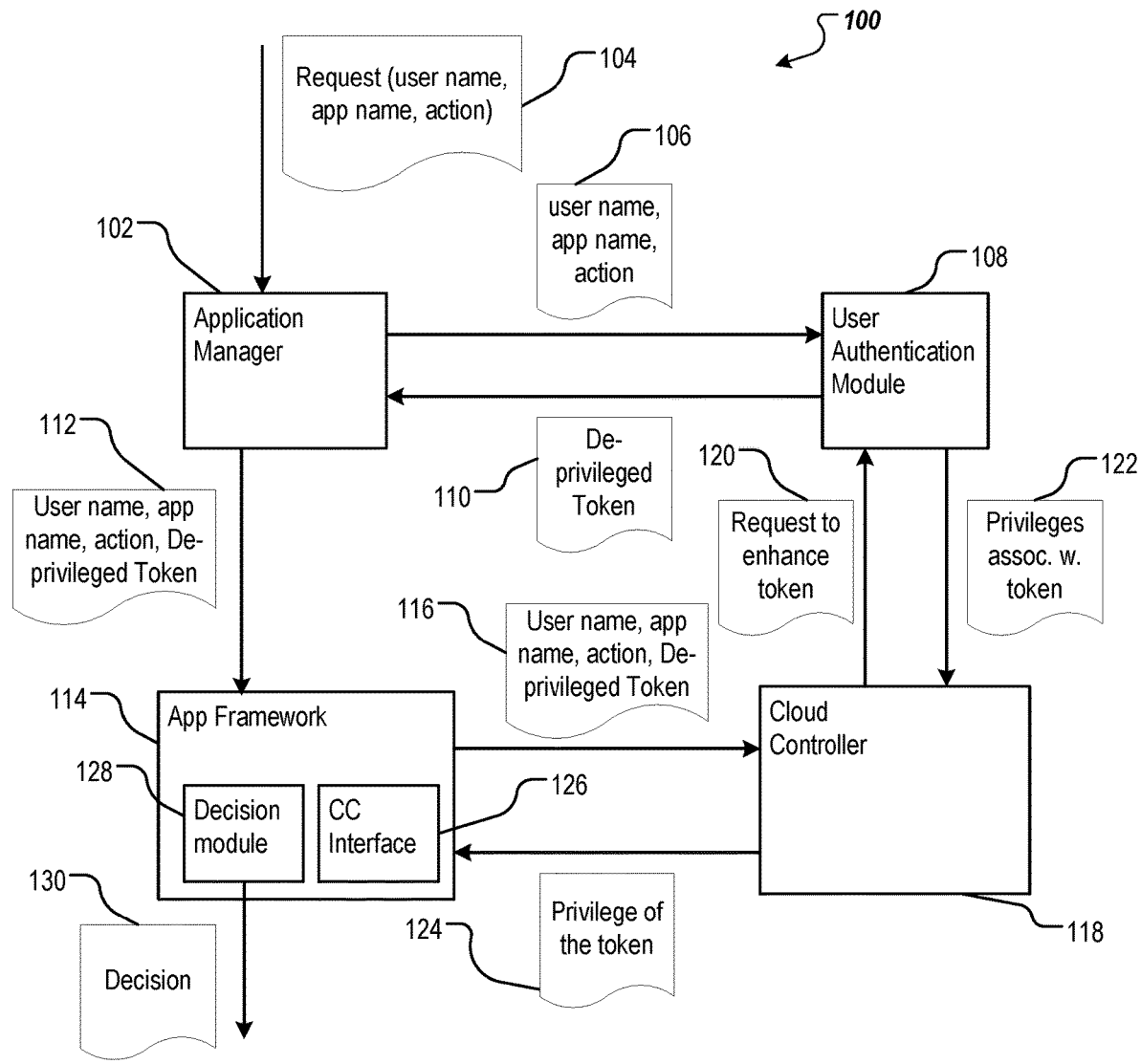
FIG. 1 is a block diagram illustrating example techniques of distributed validation of credentials.

FIG. 1 is a block diagram illustrating example techniques of distributed validation of credentials. A distributed computing system 100 implements distributed validation of credentials. The distributed computing system 100 provides a cloud-based computing environment and includes multiple components, which are described below. Each component of the distributed computing system 100 can be implemented on one or more computers each including one or more computer processors. An example of the distributed computing system 100 is a Pivotal Cloud Foundry (PCF) installation.

The distributed computing system 100 includes an application manager 102. The application manager 102 can include a Web based tool, a command line tool, or a batch processing tool for managing organizations, spaces, applications, services, and users. The application manager 102 can be, for example, a Pivotal Apps Manager component. The application manager 102 receives a first request 104. The first request 104 specifies a user, an application, and an action to be performed by the user on the application. For example, the first request 104 can include a user name, an application identifier, and a representation of the action. The action can be, for example, modifying the application, viewing environment variables of the application, among others.

In response to the first request 104, the application manager 102 submits a second request 106 to a user authentication module 108. The second request 106 is a request for partial authentication and includes at least one of the user name, application name or action as specified in the first request 104.

The user authentication module 108 is a component of the distributed computing system 100 configured to provide identity management service for the distributed computing system 100. The user authentication module 108 can perform a role as a token provider, e.g., as an OAuth2 provider as specified in the OAuth 2.0 Authorization Framework as published by Internet Engineering Task Force (IETF) Request for Comment (RFC) 6749. The user authentication module 108 can issue tokens for client applications to use when they act on behalf of system users. An example of the user authentication module 108 is a Pivotal UAA Server module.

Upon receiving the request 106, the user authentication module 108 issues a de-privileged token 110. The de-privileged token 110 is a token that indicates partial and incomplete rights of a user. For example, in the de-privileged token 110, some access rights to system operations may not be represented. The de-privileged token 110 can be a token conforming to the OAuth2.0 framework or other framework for authentication.

The application manager 102 receives the de-privileged token 110 as a response to the second request 106. In response to receiving the de-privileged token 110, the application manager 102 provides user authentication information 112 to an application framework 114. The user authentication information 112 can include one or more of the user name, the application identifier, the action, or the de-privileged token 110.

The application framework 114 is a framework for building Web applications. The application framework 114 is configured to, for example, handle dependency injection, handle transactions, and implement model-view-controller architecture. An example of the application framework 114 is Pivotal Spring Boot. The application framework 114, upon receiving the user authentication information 112, can submit a third request 116 to a cloud controller 118. The third request 116 can include at least one of the user name, the application identifier, the action, and the de-privileged token 110 as provided in the user authentication information 112. The third request 116 causes the cloud controller 118 to perform secondary authentication separately from the first authentication operations between the application manager 102 and the user authentication module 108.

The cloud controller 118 is a component of the system 100 configured to direct deployment of applications on the system 100. The cloud controller 118 is also configured to provide REST API endpoints for client devices to access the system 100. The cloud controller 118 can maintain a database with records for organizations, spaces, services, and user roles, among others. In response to receiving the third request 116, the cloud controller 118 submits a fourth request 120 to enhance the token. The fourth request 120 to enhance the token can include at least one of the user name, application identifier, action, or de-privileged token 110. The fourth request 120 can include authentication information confirming the identity of the cloud controller 118. The cloud controller 118 can submit the fourth request 120 to enhance the token to the user authentication module 108. The cloud controller 118 preferably communicates with the user authentication module 108 over a secured and encrypted communication channel.

Through the secured and encrypted channel, the cloud controller 118 receives privileges 122 associated with the de-privileged token 110. The privileges 122 are the result of second authentication operations performed by the user authentication module 108. The privileges 122 can include information on whether the specific user has privilege to perform the specific action for a specific application, a specific deployment, or for a specific cloud controller operation. The privileges 122 can include privileges directed to system operations of the cloud controller 118.

Upon receiving the privileges 122, the cloud controller 118 presents a response 124 to the application framework 114 as a reply to the request 116. The cloud controller 118 can communicate with the application framework 114 over a secured and encrypted communication channel. The response can include the privileges 122 associated with the de-privileged token 110. The application framework 114 can include a cloud controller interface 126 for sending the request 116 and receiving the response 124. The cloud controller interface 126 ensures separation between the de-privileged token 110 and the privileges in the response 124.

The application framework 114 can include a decision module 128. The decision module 128 is a component of the application framework 114 that makes a decision based on the user name, application, and specification specified in the request 104 and the privileges 122 provided by the cloud controller 118 in the response 124. For example, the decision module 128 can perform a comparison between the user name, application, and specification and privileges. The decision module 128 can then provide a decision 130 to the application framework 114 or to another module. For example, in some implementations, the decision 130 can indicate to the application framework 114 whether to provide requested information for display in a Web interface of the application manager 102.

Figure 2:
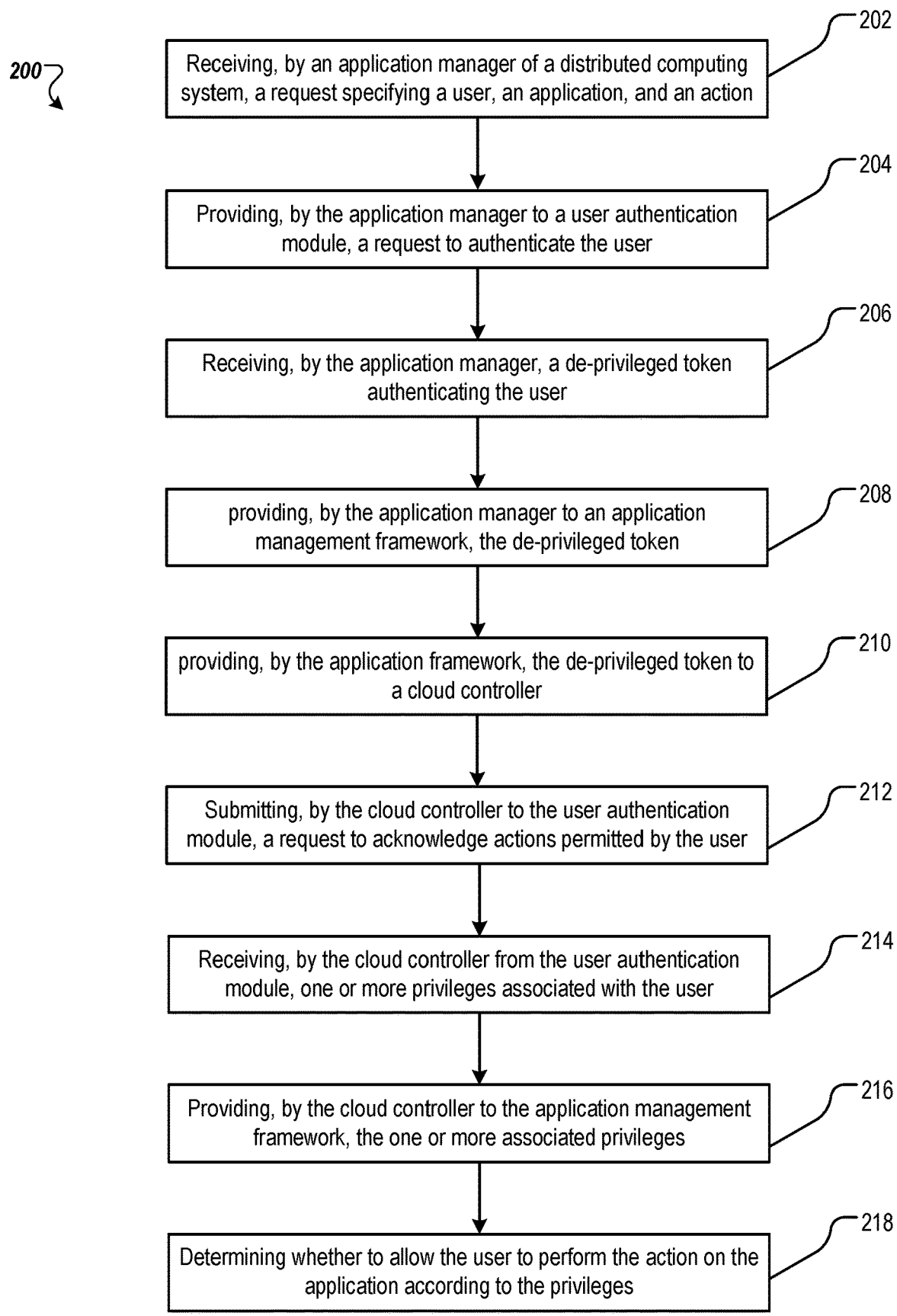
FIG. 2 is a flowchart illustrating an example process of distributed validation of credentials.

FIG. 2 is a flowchart illustrating an example process 200 of distributed validation of credentials. Process 200 can be executed by a distributed computing system, e.g., the distributed computing system 100 discussed in reference to FIG. 1. Each component of the system as described below can be implemented on one or more computers including one or more hardware processors.

An application manager of the system receives (202) a request from or on behalf of a user, an application, and an action to be performed by the user on or in reference to the application. The application manager can receive the request from a command line input, a batch script, a Web browser based user interface, or any other suitable interface. The action can include, for example, at least one of viewing health, viewing application-specific information, viewing environment variables, viewing contents of memory, viewing thread diagnostics, viewing application-specific metrics, and viewing or modifying configurations of application. The application can be an application that exposes an API, e.g., REST API, while executing in the distributed computing system. The application may expose an API that is different from a core API, e.g., an API for a cloud controller, a user authentication module, or a routing module. Accordingly, authorities represented by tokens for the application may be different from, and may be prevented from commingling with, authorities for accessing the core API.

The application manager of the system provides (204), to a user authentication module of the system, a request to authenticate the user. The user authentication module can include a UAA server of the system. The user authentication module can be a component compliant to the OAuth2.0 framework or other authentication frameworks.

The application manager of the system receives (206), from the user authentication module, de-privileged token authenticating the user. The de-privileged token includes partial access rights associated with the user. A de-privileged token is an authorization token that authorizes less than all the rights permissible for a user. The de-privileged token does not include authorization for accessing certain system functions, e.g., for manipulating a cloud controller.

The application manager of the system provides (208), to an application framework of the system, data identifying the specified user, application, and action and the de-privileged token. The application framework can be a bootstrap application framework, e.g., a Pivotal Spring Boot framework.

The application framework provides (210) the de-privileged token to a cloud controller of the system. Compared to conventional techniques where complete authentication is associated with the token, providing only the de-privileged token to the cloud controller provides additional security by allowing the crowd controller to perform a separate authentication operation without user interference.

The cloud controller of the system submits (212), to the user authentication module, a request to enhance the de-privileged token. The request can seek acknowledgement on what actions are permitted by the user. The request includes the de-privileged token.

The cloud controller of the system receives (214), from the user authentication module, information one or more privileges associated with the user that are not represented in the de-privileged token. The one or more privileges can be system access privileges, e.g., privileges for accessing functions of the cloud controller for manipulating deployment of the application. The privileges are privileged of a user that are not represented in the de-privileged token.

The cloud controller of the system provides (216) the one or more associated privileges to the application framework, for example, through an encrypted channel, and without providing the de-privileged token. On each of the application manager, the application framework and the cloud controller, the privileges and the de-privileged token are encoded and stored separately.

The application framework of the system determines (218) whether to allow the user to perform the action on the application based on a comparison between the action and the one or more privileges. Upon determining that the user has the permissions needed to perform the action, a component of the system performs the action and presents a result of the action to the user, e.g., on an output device. For example, the system can present the result of the action for display in a Web browser on a display screen of a client device. Accordingly, from the user's point of view, the distributed authentication of credentials described in this specification can be invisible.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   providing, by an application manager of a distributed computing system to a user authentication module of the distributed computing system, a request to authenticate a user;
   receiving, by the application manager from the user authentication module, a de-privileged token authenticating the user, wherein the de-privileged token includes partial access rights associated with the user;
   providing, by the application manager to an application framework of the distributed computing system, data identifying the user, an application, an action, and the de-privileged token;
   providing, by the application framework to a cloud controller of the distributed computing system, the de-privileged token;
   submitting, by the cloud controller to the user authentication module, a request to enhance the de-privileged token;
   receiving, by the cloud controller from the user authentication module, information on one or more privileges associated with the user that are not represented in the de-privileged token; and
   providing, by the cloud controller to the application framework, the information on one or more associated privileges.

2. The method of claim 1, wherein providing the request to authenticate the user occurs in response to receiving, by the application manager, a request specifying the user, the application, and the action to be performed by the user on the application.

3. The method of claim 1, comprising:
   determining, by the application framework, whether to allow the user to perform the action on the application based on a comparison between the action and the one or more privileges associated with the user.

4. The method of claim 1, wherein:
   the user authentication module includes a user account and authentication (UAA) server of the distributed computing system; and
   the action includes at least one of at least one of view health, view application-specific information, view environment variables, view contents of memory, view thread diagnostics, view application-specific metrics, and view or modify configuration of application.

5. The method of claim 1, wherein providing, by the cloud controller to the application framework, the one or more associated privileges is performed through an encrypted channel and wherein the one or more associated privileges is unaccompanied by the de-privileged token.

6. The method of claim 1, comprising, upon determining to allow the user to perform the action, presenting a result of the action on an output device.

7. The method of claim 1, wherein on each of the application manager, the application framework and the cloud controller, the privileges and the de-privileged token are encoded separately.

8. A non-transitory computer readable storage medium storing instructions executable by a data processing apparatus and upon such execution cause the data processing apparatus to perform operations comprising:

providing, by an application manager of a distributed computing system to a user authentication module of the distributed computing system, a request to authenticate a user;

receiving, by the application manager from the user authentication module, a de-privileged token authenticating the user, wherein the de-privileged token includes partial access rights associated with the user;

providing, by the application manager to an application framework of the distributed computing system, data identifying the user, an application, an action, and the de-privileged token;

providing, by the application framework to a cloud controller of the distributed computing system, the de-privileged token;

submitting, by the cloud controller to the user authentication module, a request to enhance the de-privileged token;

receiving, by the cloud controller from the user authentication module, information on one or more privileges associated with the user that are not represented in the de-privileged token; and providing, by the cloud controller to the application framework, the information on one or more associated privileges.

9. The non-transitory computer readable storage medium of claim 8, wherein providing the request to authenticate the user occurs in response to receiving, by the application manager, a request specifying the user, the application, and the action to be performed by the user on the application.

10. The non-transitory computer readable storage medium of claim 8, the operations comprising:
determining, by the application framework, whether to allow the user to perform the action on the application based on a comparison between the action and the one or more privileges associated with the user.

11. The non-transitory computer readable storage medium of claim 8, wherein:
the user authentication module includes a user account and authentication (UAA) server of the distributed computing system; and
the action includes at least one of at least one of view health, view application-specific information, view environment variables, view contents of memory, view thread diagnostics, view application-specific metrics, and view or modify configuration of application.

12. The non-transitory computer readable storage medium of claim 8, wherein providing, by the cloud controller to the application framework, the one or more associated privileges is performed through an encrypted channel and wherein the one or more associated privileges is unaccompanied by the de-privileged token.

13. The non-transitory computer readable storage medium of claim 8, the operations comprising, upon determining to allow the user to perform the action, presenting a result of the action on an output device.

14. The non-transitory computer readable storage medium of claim 8, wherein on each of the application manager, the application framework and the cloud controller, the privileges and the de-privileged token are encoded separately.

15. A system comprising:
one or more computers; and
one or more storage devices on which are stored instructions that are operable, when executed by the one or more computers, to cause the one or more computers to perform operations comprising:
providing, by an application manager of a distributed computing system to a user authentication module of the distributed computing system, a request to authenticate a user;
receiving, by the application manager from the user authentication module, a de-privileged token authenticating the user, wherein the de-privileged token includes partial access rights associated with the user;
providing, by the application manager to an application framework of the distributed computing system, data identifying the user, an application, an action, and the de-privileged token;
providing, by the application framework to a cloud controller of the distributed computing system, the de-privileged token;
submitting, by the cloud controller to the user authentication module, a request to enhance the de-privileged token;
receiving, by the cloud controller from the user authentication module, information on one or more privileges associated with the user that are not represented in the de-privileged token; and
providing, by the cloud controller to the application framework, the information on one or more associated privileges.

16. The system of claim 15, wherein providing the request to authenticate the user occurs in response to receiving, by the application manager, a request specifying the user, the application, and the action to be performed by the user on the application.

17. The system of claim 15, the operations comprising:
determining, by the application framework, whether to allow the user to perform the action on the application based on a comparison between the action and the one or more privileges associated with the user.

18. The system of claim 15, wherein:
the user authentication module includes a user account and authentication (UAA) server of the distributed computing system; and
the action includes at least one of at least one of view health, view application-specific information, view environment variables, view contents of memory, view thread diagnostics, view application-specific metrics, and view or modify configuration of application.

19. The system of claim 15, wherein providing, by the cloud controller to the application framework, the one or more associated privileges is performed through an encrypted channel and wherein the one or more associated privileges is unaccompanied by the de-privileged token.

20. The system of claim 15, wherein on each of the application manager, the application framework and the cloud controller, the privileges and the de-privileged token are encoded separately.

* * * * *